United States Patent
Kim

(10) Patent No.: US 8,749,351 B2
(45) Date of Patent: Jun. 10, 2014

(54) SYSTEM AND METHOD FOR DETERMINING LOCATION

(75) Inventor: Jae Wook Kim, Seoul (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 334 days.

(21) Appl. No.: 13/407,671

(22) Filed: Feb. 28, 2012

(65) Prior Publication Data

US 2012/0229257 A1    Sep. 13, 2012

(30) Foreign Application Priority Data

Mar. 8, 2011   (KR) .................. 10-2011-0020248

(51) Int. Cl.
  *G08B 5/22*   (2006.01)
  *H02J 13/00*  (2006.01)
  *H04Q 5/22*   (2006.01)
  *H04B 1/00*   (2006.01)
  *H04W 4/00*   (2009.01)

(52) U.S. Cl.
  USPC ....... 340/8.1; 340/10.1; 340/10.34; 340/10.4; 340/9.1; 375/146; 375/147; 375/150; 370/328

(58) Field of Classification Search
  None
  See application file for complete search history.

(56) References Cited

U.S. PATENT DOCUMENTS

| | | | |
|---|---|---|---|
| 2007/0182556 A1* | 8/2007 | Rado ........................ | 340/572.1 |
| 2008/0111693 A1* | 5/2008 | Johnson et al. ........... | 340/572.1 |
| 2010/0127831 A1 | 5/2010 | Cha et al. | |
| 2010/0188211 A1* | 7/2010 | Brommer et al. ........ | 340/539.32 |
| 2011/0148589 A1* | 6/2011 | Johnson et al. ........... | 340/10.1 |

FOREIGN PATENT DOCUMENTS

| | | |
|---|---|---|
| CN | 1541338 | 10/2004 |
| CN | 1963561 | 5/2007 |
| JP | 2009-174971 | 8/2009 |

OTHER PUBLICATIONS

The State Intellectual Property Office of the People's Republic of China Application Serial No. 201210060186.0, Office Action dated Dec. 4, 2013, 6 pages.

* cited by examiner

*Primary Examiner* — George Bugg
*Assistant Examiner* — Renee Dorsey
(74) *Attorney, Agent, or Firm* — Lee, Hong, Degerman, Kang & Waimey

(57) ABSTRACT

The present invention introduces a location determining system. The location determining system includes a reader array and a location determining engine server. The reader array includes three readers, where each reader includes a plurality of reader groups that receives a tag information signal transmitted from the tag, generates a PN code generated from inside, correlation and standard deviation of the correlation, and bypasses the tag information signal, in a case a ratio of correlation and standard deviation of the correlation is greater than a predetermined critical value. The location determining engine server determines a final location value relative to the tag, using the tag information signal having a time difference of tag information signals received from the three readers forming each reader group among the tag information signals bypassed by the plurality of reader groups smaller than a predetermined marginal time difference.

8 Claims, 4 Drawing Sheets

SYSTEM AND METHOD FOR DETERMINING LOCATION

CROSS-REFERENCE TO RELATED APPLICATION

Pursuant to 35 U.S.C. §119 (a), this application claims the benefit of earlier filing date and right of priority to Korean Patent Application No. 10-2011-0020248 filed on Mar. 8, 2011, the contents of which is hereby incorporated by reference in their entirety.

BACKGROUND OF THE INVENTION

1. Field of the Invention

The present invention relates to a location (position) system, and more particularly, to a system and method for determining location (position) configured to minimize a measurement error of tag location.

2. Description of the Related Art

In 2.4 GHz real time locating system (RTLS) according to ISO/IEC 24730-2 international standard, a tag transmits a tag signal at a predetermined period, and a time difference of arrival (TDOA) by the tag signal to a multiple reader is calculated to estimate a tag location. To this end, at least three readers must receive signals transmitted by a tag.

FIG. 1 illustrates a tag signal transmitted by a tag.

Referring to FIG. 1, a tag repeatedly transmits a blank signal, DSSS (Direct Sequence Spread Spectrum) including a tag ID (Identification), or a sub-blank signal including same data. The blank signal or the sub-blank signal, although not illustrated in FIG. 1, is a signal where a tag ID or tag data information and PN (Pseudo Noise) code are EXOR (Exclusive-OR) performed, and transformed to the DSSS.

FIG. 2 illustrates a PN code generator generating a PN code. Referring to FIG. 2, the PN code generator generates a PN code having 511 chips using PN spread code Ox1CB.

According to the ISO/IEC 24730-2 international standard, a tag must transmit a blank signal having ±638 ms (milliseconds) interval within a period, i.e., within a time section of minimum 5 seconds or more, or transmit maximum eight sub-blank signals at 125 ms±16 ms interval within the same time section. At this time, it should be apparent that synchronization must be realized among the readers.

The reader having received the tag signal transmits the tag signal to a location determining engine, where the location determining engine calculates a tag location using a time difference of arrival (TDOA).

FIG. 3 illustrates a method for estimating a distance to a tag using the TDOA. Referring to FIG. 3, the TDOA read by a pair of readers may draw a pair of hyperbolas (dTOA$_{23}$, dTOA$_{12}$) having a predetermined difference of distance with the reader as vertex. An intersection point (tag) of these hyperbolas is estimated as a tag location.

A wireless communication environment creates problems attenuation, reflection, scattering and refraction of radio signal due to atmospheric temperature, humidity change and numerous communication obstacles. The problems may delay a tag transmission signal that must be measured, or attenuate the signal itself to disable measurement of arrival time of signal or increase an error thereof.

SUMMARY OF THE INVENTION

Accordingly, the present invention is directed to a system for determining a location (hereinafter referred to as location determining system) configured to accurately measure a tag location by grouping a plurality of readers in three readers, each receiving a signal transmitted by a tag, and by using a location value of each tag measured by each group.

The present invention is also directed to a method for determining a location (hereinafter referred to as location determining method) configured to accurately measure a tag location by grouping a plurality of readers in three readers, each receiving a signal transmitted by a tag, and by using a location value of each tag measured by each group.

Additional advantages, aspects, and features of the invention will be set forth in part in the description which follows and in part will become apparent to those having ordinary skill in the art upon examination of the following or may be learned from practice of the invention.

In one general aspect of the present invention, there is provided a location determining system, the system comprising: a reader array including a plurality of reader groups, each group including three readers, each reader receiving a tag information signal from a tag, generating a correlation between the tag information signal and a PN (Pseudo Noise) code generated from inside, and a standard deviation with the correlation, and bypassing the tag information signal, in a case a ratio between the correlation and the standard deviation with the correlation is greater than a predetermined critical value; and a location determining engine server determining a final location value relative to the tag using a tag information signal having a time difference of tag information signals received from the three readers forming each reader group among the tag information signals bypassed by the plurality of reader groups smaller than a predetermined marginal time difference.

Preferably, but not necessarily, the location determining engine server generates location values for each reader group using a relevant tag information signal, in a case each time difference calculated based on time of arrival in which the three tag information signals forming a group reach the location determining engine server is smaller than the predetermined marginal time difference, obtains a standard deviation and an average of location values to the tag generated by two arbitrarily selected reader groups among the plurality of reader groups, and compares an error set as the standard deviation to determine the final location value based on a result of the comparison.

Preferably, but not necessarily, the location determining system sets the average of the location values as the final location value, in a case the standard deviation of the location value is smaller than the error, adds a new reader group in a case the standard deviation of the location value is greater than the error, re-obtains an average and standard deviation of the location values to the tag by including a location value generated by the added reader group, and compares the obtained standard deviation of location value with the error, and obtains an average and standard deviation of location values including the location value generated by the new reader group at least one by one until a final location value is determined, and compares the standard deviation of the obtained location values with the error.

Preferably, but not necessarily, count of a series of operations by adding the new reader group for obtaining the final location value of the tag is restricted to M counts, where M is a natural number.

Preferably, but not necessarily, an average of location values generated by using remaining location values excluding the largest location values among M counts of location values is set as the final location value, in a case the final location value is not determined, even after the M counts of operation have been performed.

Preferably, but not necessarily, the location determining engine server uses a time difference in which the tag information signal reaches the three readers included in an arbitrary reader group to generate a location value of a relevant reader group.

Preferably, but not necessarily, at least one reader group among the plurality of reader groups shares at least one reader.

Preferably, but not necessarily, the threshold is determined by statistics or an experimental value relative to a reception sensitivity of received signal.

In another general aspect of the present invention, there is provided a method for determining a location in a location determining system including a reader array including a plurality of reader groups, each group including three readers, and a location determining engine server determining a final location value relative to a tag using tag information signals bypassed by the plurality of reader groups, the method comprising: generating location values for each reader group generating location values of tag for each of the plurality of reader groups using the tag information signals; and determining the final location value by combining at least two location values among location values of tags for each of the plurality of reader groups.

Preferably, but not necessarily, the step of generating location value for each of the plurality of reader groups includes: generating a basic group location value using the tag information signals received by the three readers and PN (Pseudo Noise) code generated from inside; generating a first group location value using the tag information signals received by the three readers and PN (Pseudo Noise) code generated from inside; and generating N th group location value using the tag information signals received by the three readers and PN (Pseudo Noise) code generated from inside, wherein the generating step of each location value is performed independently or sequentially, and N is a natural number more than 2.

Preferably, but not necessarily, each of the steps of generating a basic, a first, and Nth group location value includes: first determining passage of the tag information signals transmitted to a first reader; second determining passage of the tag information signals transmitted to a second reader; third determining passage of the tag information signals transmitted to a third reader; determining bypass of three tag information signals by calculating a time difference of arrival at the location determining engine server by the three tag information signals having passed through the first, second and third determining steps, comparing the time difference of arrival by the tag information signals to the location determining engine server with a predetermined marginal time difference, and determining whether to pass the three tag information signals; and generating group location values of tag using the bypassed tag information signals.

Preferably, but not necessarily, each of the steps of first, second and third determining includes: generating a PN code having a same electrical characteristic as that used by the tag; generating a correlation seeking for a correlation between the tag information signal and the PN code, and a deviation of the correlation; first comparing the deviation of the correlation and a predetermined critical value; transmitting information passing the tag information signals, in a case the deviation of the correlation is greater than the critical value as a result of the first comparison, and performing all the above steps by receiving a new tag information signal, in a case the deviation of the correlation is smaller than the critical value as a result of the first comparison.

Preferably, but not necessarily, the step of determining bypass includes bypassing the three tag information signals, in a case a time difference of arrival to a relevant reader by the three tag information signals is smaller than the predetermined marginal as a result of the comparison, and re-performing the first, second and third determining steps, in a case a time difference of arrival to a relevant reader by the three tag information signals is greater than the predetermined marginal as a result of the comparison.

Preferably, but not necessarily, the step of determining the final location value includes: first generating an average and standard deviation in which an average of location values and a standard deviation generated by arbitrary two reader groups among location values of each of the plurality of reader groups are generated; second generating an average and standard deviation in which, in a case the first average and the standard deviation generated by the standard deviation generating step are greater than a predetermined error, a new reader group is added to the two reader groups used at the step of first generating an average and standard deviation and averages and standard deviations are generated; and determining the average of the location value as the final location value in which the standard deviation generated by the first average and standard deviation generating step or the second average and standard deviation generating step is smaller than the predetermined error.

Preferably, but not necessarily, the number of reader groups newly added in the step of second generating an average and standard deviation is restricted to M, where M is a natural number of 2 or more.

Preferably, but not necessarily, the method further comprises generating an approximate value to the location value using remaining location values excluding the largest location value among the M number of location values, in a case a standard deviation of the M number of location values is greater than the predetermined error.

Preferably, but not necessarily, the step of determining final location value includes determining the approximate value of the location value as the final location value.

Preferably, but not necessarily, at least one of the reader groups among the plurality of reader groups shares at least one reader.

Preferably, but not necessarily, the threshold is determined by statistics or an experimental value relative to a reception sensitivity of received signal.

The system and method for determining location (position) according to the present invention has an advantageous effect in that a tag position can be accurately determined.

BRIEF DESCRIPTION OF THE DRAWINGS

The accompanying drawings, which are included to provide a further understanding of the invention and incorporated in and constitute a part of this application, illustrate exemplary embodiment (s) of the invention and together with the description serve to explain the principle of the invention. In the drawings.

DETAILED DESCRIPTION OF THE EXEMPLARY EMBODIMENTS

Figure 1:
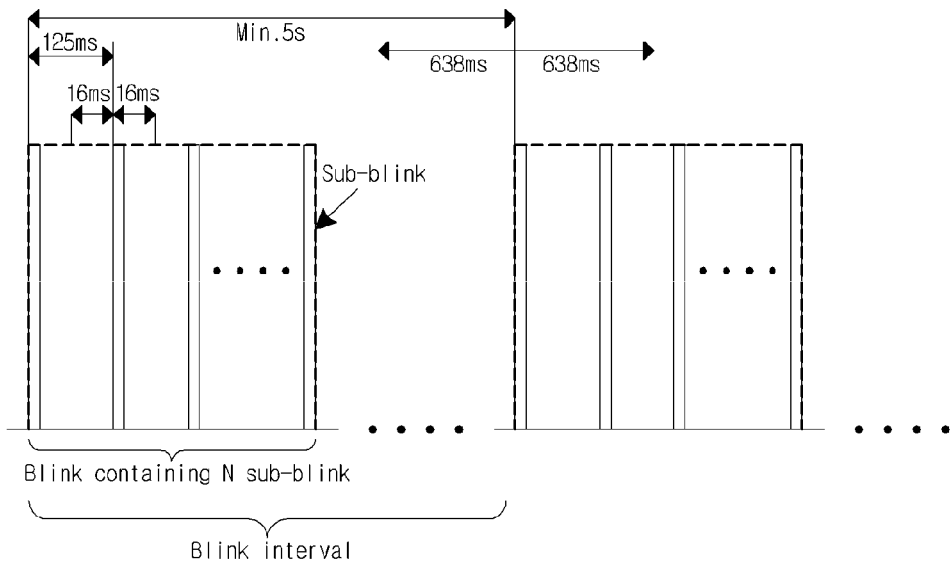
FIG. 1 is a tag signal transmitted by a tag.
Figure 2:
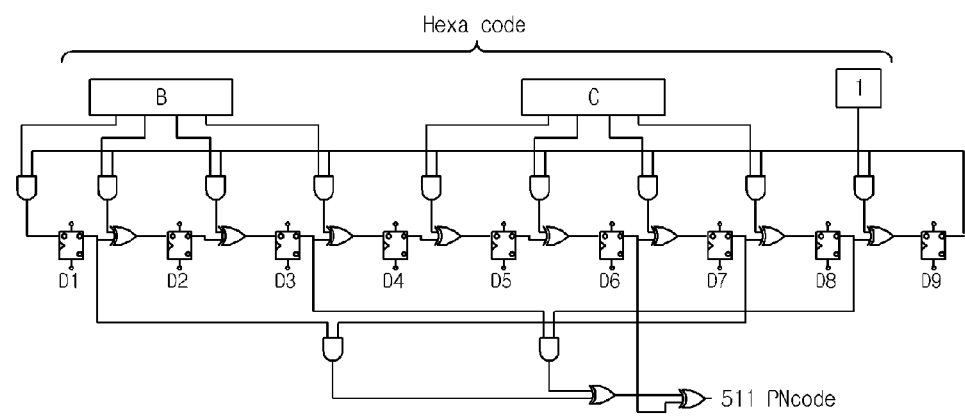
FIG. 2 is a PN code generator generating a PN code.
Figure 3:
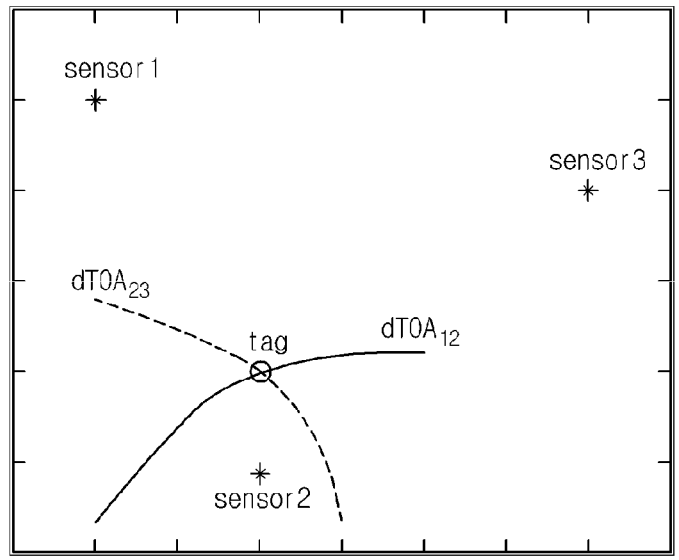
FIG. 3 is a method for estimating a distance to a tag using the TDOA.

Reference will now be made in detail to the exemplary embodiments of the present invention, examples of which are illustrated in the accompanying drawings. The invention may, however, be embodied in many different forms and should not be construed as being limited to the embodiments set forth herein. Rather, these embodiments are provided so that this disclosure will be thorough and complete, and will fully convey the concept of the invention to those skilled in the art. Wherever possible, the same reference numerals will be used throughout the drawings to refer to the same or like parts.

As used herein, the term of 'position' and 'location' may be interchangeably used. As used herein, the term of 'correlation' and 'correlation value' may be interchangeably used.

A core idea of the present invention is to group a plurality of readers, each group including three readers, to calculate a correlation between tag information signal received for each group and PN code, and standard deviation of the correlation, and to compare the calculated standard deviation with a predetermined critical value to determine a tag location using a highly reliable tag information signal.

Figure 4:
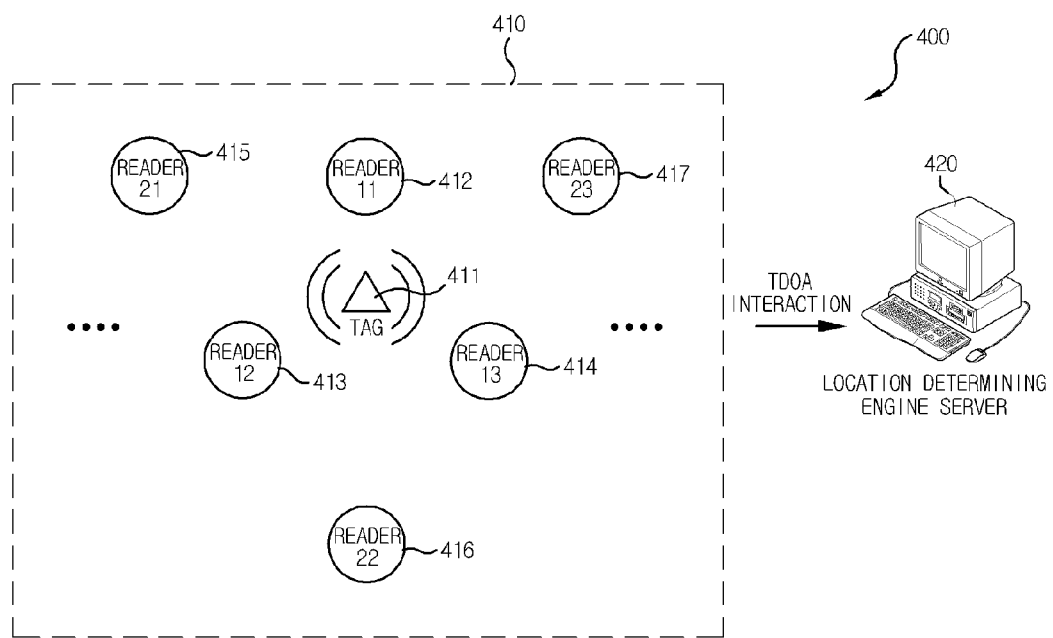
FIG. 4 is a location determining system according to the present invention.

FIG. 4 is a location determining system according to the present invention. Referring to FIG. 4, a location determining system 400 includes a reader array 410 and a location determining engine server 420. The reader array 410 includes a plurality of readers 412~417. In the present invention, three readers in the plurality of readers 412~417 are bound to form a group. For the convenience sake, a first reader group is restricted to readers 412~414 located nearest to a center of a tag 411. Thus, a second reader group includes the remaining three readers 415~417. A tag information signal transmitted from the tag includes an ID of the tag and data related to the tag.

The location determining engine server 420 calculates a time difference that has received the tag information signal from each reader to perform a function of determining a tag location. However, a final location value is determined by determining at least two location values among the location values for each group, unlike the prior art.

Hereinafter, operation of the location determining system 400 will be described in detail.

Figure 5:
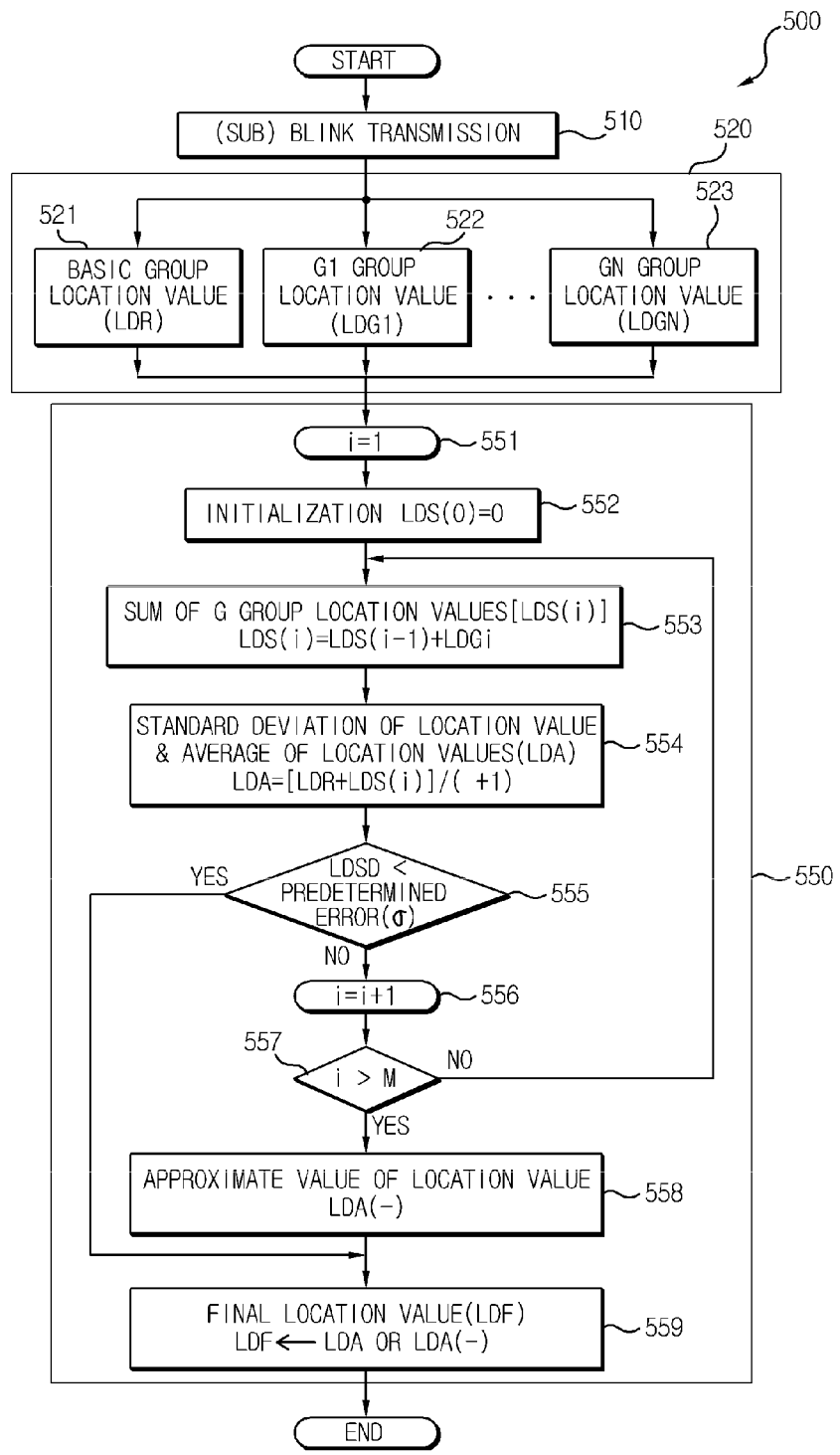
FIG. 5 is a signal flowchart illustrating a location determining method performing determination of tag location in the location determining system.

FIG. 5 is a signal flowchart illustrating a location determining method performing determination of tag location in the location determining system.

Referring to FIG. 5, a location determining method 500 largely includes a location value generating step for each reader group 520, and a location value determining step 550.

The location determining method 500 according to the present invention is performed at a location determining system including a location determining engine server determining a final location value relative to the tag, using the reader array including a plurality of reader groups each group including three readers, and tag information signals transmitted a tag bypassed by the plurality of reader groups.

The location value generating step for each reader group 520 generates a location value of a tag for each of the plurality of reader groups using the tag information signals, and includes a basic group location value generating step 521, and first group location value generating step 522 to Nth group location value generating step 523, where N is a natural number of 2 or more. The location value determining step 550 determines a final location value by combining at least two location values among location values of tag for each of the plurality of reader groups.

Hereinafter, the location value generating step for each reader group 520 will be first described in detail, and description of the location value determining step 550 will follow.

Figure 6:
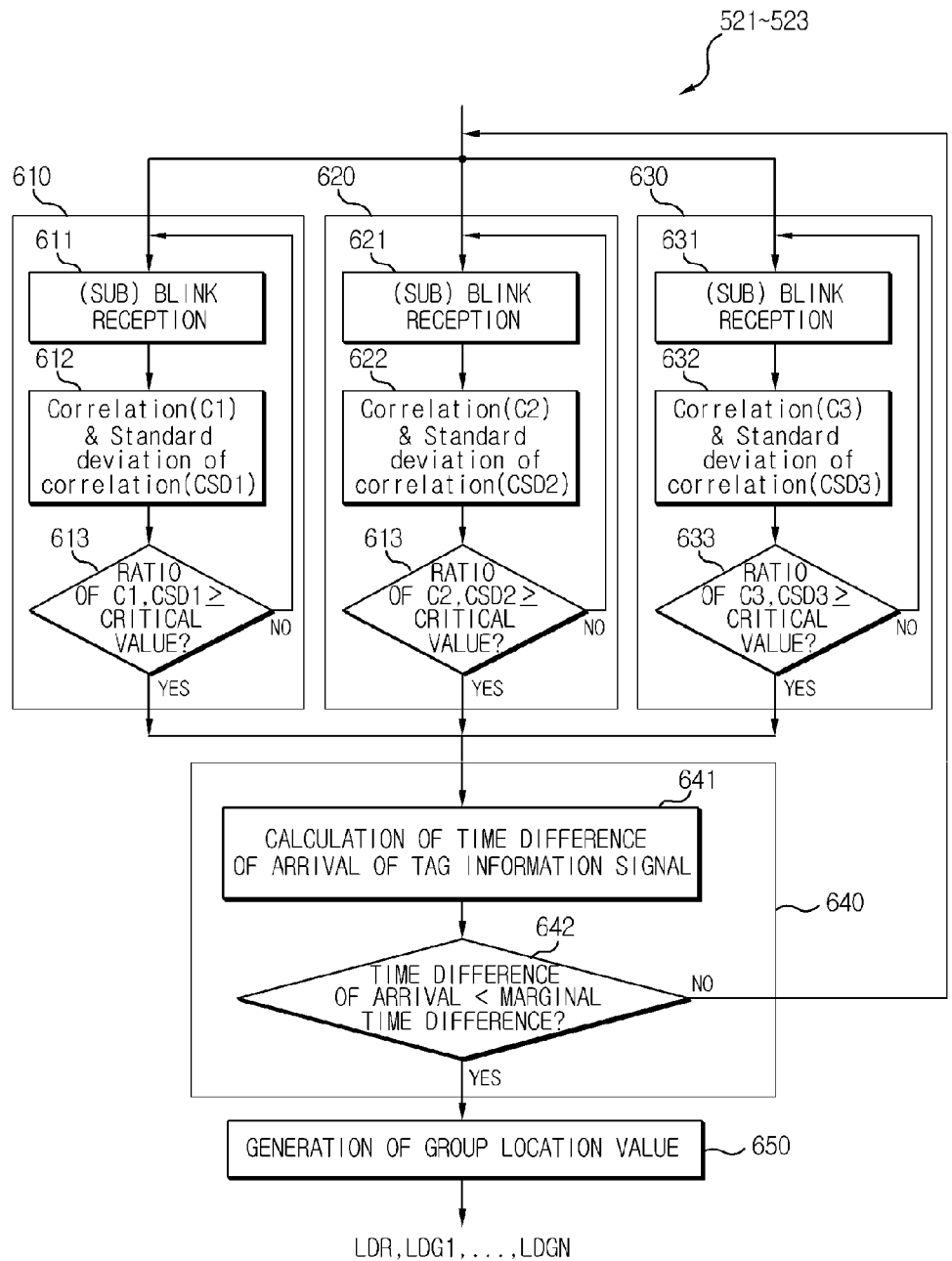
FIG. 6 is a detailed exemplary embodiment commonly included by the basic group location value generating step, and first to Nth group location value generating steps.

FIG. 6 is a detailed exemplary embodiment commonly included by the basic group location value generating step, and first to Nth group location value generating steps.

Referring to FIG. 6, each of the basic group location value generating step 521, and the first group location value generating step 522 to Nth group location value generating step 523 illustrated in FIG. 5 includes a first determining step 610, a second determining step 620, a third determining step 630, a bypass determining step 640 and a group location value generating step 650.

It should be noted that the first determining step 610, the second determining step 620, and the third determining step 630 relate to a signal processing procedure each performed by the three readers included in a same reader group.

The first determining step 610 determines whether to pass a tag information signal transmitted to a first reader to a next signal processing step. The second determining step 620 determines whether to pass a tag information signal transmitted to a second reader to a next signal processing step. The third determining step 630 determines whether to pass a tag information signal transmitted to a third reader to a next signal processing step.

The first determining step 610 includes a step of receiving a blink signal or a sub-blink signal transmitted from the tag 611, and a step of calculating a correlation 612 and a comparing step 613. The correlation calculation step 612 obtains a correlation (C1) between a PN code generated by the PN code generator having a same electrical characteristic as that of a PN code generator used by the tag and the received tag information signal, and a standard deviation (CSD1) of the correlation.

The comparing step 613 compares a ratio between the correlation (C1) and the standard deviation (CSD1) of the correlation (C1) with a predetermined critical value. As a result of the comparison, if the ratio between the correlation (C1) and the standard deviation (CSD1) of the correlation (C1) is greater than or equal to the predetermined critical value, the received tag information signal is passed to a bypass determining step 640. As a result of the comparison, if the ratio between the correlation (C1) and the standard deviation (CSD1) of the correlation (C1) is smaller than the predetermined critical value, the signal receiving step 611 and the correlation calculation step 612 are re-performed, and the then, the comparison step 613 is performed.

The second determining step 620 includes receiving a blink signal or a sub-blink signal transmitted from a tag 621; calculating correlation 622 and comparing 623. The correlation calculation step 622 obtains a correlation (C2) between a PN code generated by the PN code generator having a same electrical characteristic as that of a PN code generator used by the tag and the received tag information signal, and a standard deviation (CSD2) of the correlation (C2).

The comparing step 623 compares a ratio between the correlation (C2) and the standard deviation (CSD2) of the correlation (C2) with a predetermined critical value. As a result of the comparison, if the ratio between the correlation (C2) and the standard deviation (CSD2) of the correlation (C2) is greater than or equal to the predetermined critical value, the received tag information signal is passed to a bypass determining step 640. As a result of the comparison, if the ratio between the correlation (C2) and the standard deviation (CSD2) of the correlation (C2) is smaller than the predetermined critical value, the signal receiving step 621 and the correlation calculation step 622 are re-performed, and then, the comparison step 623 is performed.

The third determining step 630 includes receiving a blink signal or a sub-blink signal transmitted from a tag 631; calculating correlation 632 and comparing 633. The correlation calculation step 632 obtains a correlation (C3) between a PN code generated by the PN code generator having a same electrical characteristic as that of a PN code generator used by the tag and the received tag information signal and a standard deviation (CSD3) of the correlation (C3).

The comparing step 633 compares a ratio between the correlation (C3) and the standard deviation (CSD3) of the correlation (C3) with a predetermined critical value. As a result of the comparison, if the ratio between the correlation (C3) and the standard deviation (CSD3) of the correlation (C3) is greater than or equal to the predetermined critical value, the received tag information signal is passed to a bypass determining step 640. As a result of the comparison, if the ratio between the correlation (C3) and the standard deviation (CSD3) of the correlation (C3) is smaller than the predetermined critical value, the signal receiving step 631 and the correlation calculation step 632 are re-performed, and then, the comparison step 633 is performed. At this time, the critical value used in the first, second and third determining steps 610, 620, 630 is determined by statistics or an experimental value relative to a reception sensitivity of received signal.

The bypass determining step 640 includes calculating 641 a time difference of arrival to the location determining engine server by three tag information signals having passed the first, second and third determining steps 610, 620, 630, and determining whether to bypass the three tag information signals by comparing the time difference of arrival to the location determining engine server by three tag information signals with a predetermined margin(al) time difference. As a result of comparison, if the time difference of arrival to the location determining engine server by three tag information signals is smaller than the predetermined marginal time difference, a relevant tag information signal is bypassed to the group location value generating step 650. As a result of comparison, if the time difference of arrival to the location determining engine server by three tag information signals is greater than the predetermined marginal time difference, a step before the first, second and third determining steps 610, 620, 630 is re-performed.

According to the ISO/IEC 24730-2 international standard, location data must be situated within a radius of 3 m, such that the marginal time difference must be set at 10 ns according to the ISO/IEC 24730-2 international standard. Radio wave time difference of 3 m is 10 ns in view of the fact that propagation velocity of radio wave is 300,000 km/sec. If TDOA is calculated by the value within the time difference, an error scope of 3 m can be obtained.

The group location value generating step 650 generates group location values (LDR, LDGQ, . . . LDGN) of tag using the bypassed tag information signals. Although FIG. 6 has illustrated a group location value generating step, other remaining group location value generating steps may include the same executing step.

Hereinafter, the location value determining step 550 will be described with reference to FIG. 5.

The location value determining step (550) determines a final location value relative to a tag using at least two location values among the plurality of reader group location values (LDR, LDGQ, . . . LDGN), where an initial value of a sum {LDS (0)} of group location values is set at zero (0).

First, a variable 'i' is 1 (551), such that a sum {LDS (1)} of group location values is same as a location value (LKG1) of a first group (553). An average (LDA) of the location value (LDR) of basic group and the sum {LDS (1)} of group location values may be expressed by the following equation 1.

$$LDA = \frac{LDR + LDS(i)}{i+1} \qquad \text{[Equation 1]}$$

A standard deviation (LDSD) of location value is determined by the location value (LDR) of basic group and the location value (LDG1) of the first group, if 'i' is 1 (554).

Although the average (LDA) of the location value may be set as the final location value (LDA) if the standard deviation (LDSD) of location value is smaller than a predetermined error ($\sigma$), if the standard deviation (LDSD) of location value is greater (NO) than a predetermined error ($\sigma$), the variable is increased by 1 (556), and the signal processing procedure must be performed again from the step (553) of obtaining the sum of group location values (555).

At this time, the size of increasing variable is preferably restricted to a predetermined size in order to prevent waste of location determining engine resources. Thus, M is restricted to a natural number of 2 or more in FIG. 5 (557).

If the standard deviation (LDSD) thus formed is greater than the predetermined error ($\sigma$) (557, YES), despite the fact that the signal processing has been performed using a maximum variable, an approximate average {LDA (−)} of location values is obtained (558). The approximate average {LDA (−)} of location values is an average of remaining location values excluding the location values having the largest difference when compared with the average (LDA) of the current location values among the first to Nth group location values. Thus, in a final location value determining step (559), one of the values in the average value (LDA) of location values generated when the variable 'i' is smaller than M or the approximate average {LDA (−)} of location values is set as the final location value (LDF).

As apparent from the foregoing, the system and method for determining location according to the present invention has an industrial applicability in that reliability of location signal can be enhanced using a blink signal repetitively outputted from a tag by way of space diversity method, whereby an accurate tag location can be determined. It will be apparent to those skilled in the art that various modifications and variations can be made in the present invention. Thus, it is intended that the present invention covers such modifications and variations of the invention. The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A location determining system, the system comprising:
a reader array including a plurality of reader groups, each group including three readers, each reader receiving a tag information signal from a tag, generating a correlation between the tag information signal and a PN (Pseudo Noise) code generated from inside, and a standard deviation with the correlation, and bypassing the tag information signal, in a case a ratio between the correlation and the standard deviation with the correlation is greater than a predetermined critical value; and a location determining engine server determining a final location value relative to the tag using a tag information signal having a time difference of tag information signals received from the three readers forming each reader group among the tag information signals bypassed by the plurality of reader groups smaller than a predetermined marginal time difference.

2. The system of claim 1, wherein the location determining engine server generates location values for each reader group using a relevant tag information signal, in a case each time difference calculated based on time of arrival in which the three tag information signals forming a group reach the location determining engine server is smaller than the predetermined marginal time difference, obtains a standard deviation and an average of location values to the tag generated by two arbitrarily selected reader groups among the plurality of reader groups, and compares an error set as the standard deviation to determine the final location value based on a result of the comparison.

3. The system of claim 2, wherein the location determining system sets the average of the location values as the final location value, in a case the standard deviation of the location value is smaller than the error, adds a new reader group in a case the standard deviation of the location value is greater than the error, re-obtains an average and standard deviation of the location values to the tag by including a location value generated by the added reader group, and compares the obtained standard deviation of location value with the error, and obtains an average and standard deviation of location values including the location value generated by the new reader group at least one by one until a final location value is determined, and compares the standard deviation of the obtained location values with the error.

4. The system of claim 3, wherein count of a series of operations by adding the new reader group for obtaining the final location value of the tag is restricted to M counts, where M is a natural number.

5. The system of claim 4, wherein an average of location values generated by using remaining location values excluding the largest location values among M counts of location values is set as the final location value, in a case the final location value is not determined, even after the M counts of operation have been performed.

6. The system of claim 2, wherein the location determining engine server uses a time difference in which the tag information signal reaches the three readers included in an arbitrary reader group to generate a location value of a relevant reader group.

7. The system of claim 1, wherein at least one reader group among the plurality of reader groups shares at least one reader.

8. The system of claim 1, wherein the critical value is determined by statistics or an experimental value relative to a reception sensitivity of received signal.

* * * * *